United States Patent [19]
Laiewski et al.

[11] Patent Number: 4,576,278
[45] Date of Patent: Mar. 18, 1986

[54] PURGE TRAP TRAY

[75] Inventors: Stanislaus Laiewski, Reading; Thomas A. Hessen, Ephrata; Thomas R. Hardy, Lebanon; Allie F. Gilvin, Sinking Spring, all of Pa.

[73] Assignee: W. R. Grace & Co., Cryovac Div., Duncan, S.C.

[21] Appl. No.: 650,560

[22] Filed: Sep. 13, 1984

Related U.S. Application Data

[63] Continuation of Ser. No. 443,993, Nov. 23, 1982, abandoned.

[51] Int. Cl.$^4$ ............................................. B65D 81/26
[52] U.S. Cl. ................................. 206/204; 229/2.5 R; 426/106; 426/124; 426/326
[58] Field of Search ................. 206/204, 205; 229/2.5; 426/106, 124, 129, 324, 326, 396, 410, 412

[56] References Cited

U.S. PATENT DOCUMENTS

| | | | |
|---|---|---|---|
| D. 218,024 | 7/1970 | Clayton | D9/425 |
| D. 242,052 | 10/1976 | Van Ness . | |
| 3,026,209 | 3/1962 | Niblack et al. | 206/204 |
| 3,040,948 | 6/1962 | Wells | 229/2.5 R |
| 3,040,949 | 6/1962 | Foote | 229/2.5 R |
| 3,067,921 | 12/1962 | Reifers . | |
| 3,151,799 | 10/1964 | Engles, Jr. et al. | 229/2.5 R |
| 3,155,303 | 11/1964 | Fenkel | 229/2.5 R |
| 3,209,978 | 10/1965 | Dupuis | 426/124 |
| 3,264,120 | 8/1966 | Westcott | 426/124 |
| 3,288,346 | 11/1966 | Peppler | 220/428 |
| 3,409,199 | 11/1968 | Lake . | |
| 3,450,326 | 6/1969 | Foote . | |
| 3,468,468 | 9/1969 | Foote | 229/2.5 R |
| 3,548,736 | 12/1970 | Wahl . | |
| 3,575,287 | 4/1971 | Graveley | 426/124 |
| 3,608,143 | 9/1971 | Schutz . | |
| 3,834,606 | 9/1974 | Andersson | 229/2.5 R |
| 3,932,575 | 1/1976 | Anderson . | |
| 4,275,811 | 6/1981 | Miller | 206/204 |
| 4,321,997 | 3/1982 | Miller | 206/204 |
| 4,442,969 | 4/1984 | Holden | 229/2.5 R |

FOREIGN PATENT DOCUMENTS

| | | | |
|---|---|---|---|
| 2036748 | 1/1972 | Fed. Rep. of Germany | 229/2.5 R |
| 1168925 | 10/1969 | United Kingdom | 229/2.5 R |

OTHER PUBLICATIONS

Model of tray produced by *Scandplast*.
Product Date Sheet No. 112-AC-DL-80, Apr. 1981.

*Primary Examiner*—William Price
*Assistant Examiner*—Bryon Gehman
*Attorney, Agent, or Firm*—John J. Toney; William D. Lee, Jr.; Mark B. Quatt

[57] ABSTRACT

The present invention relates to a food tray for supporting, containing and displaying food products which tend to exude or purge juices or liquids. In particular, the present invention relates to a food tray which comprises a sunken exudate reservoir. The reservoir is formed by adhering a sheet of a liquid impermeable material in a liquid tight manner to a raised shoulder area of a support portion of the tray to form a false bottom. The sheet material is further supported by standoffs rising up from the tray bottom. The sheet material is also perforated so as to allow flow of the exudate or purge through the sheet down into the reservoir where the exudate is trapped and retained out of contact with a food product which is located on top of said supported sheet. Preferably, the sheet material is opaque and the exudate is thereby hidden from view. Even more preferably, the sheet material is of the same color as the tray.

5 Claims, 19 Drawing Figures

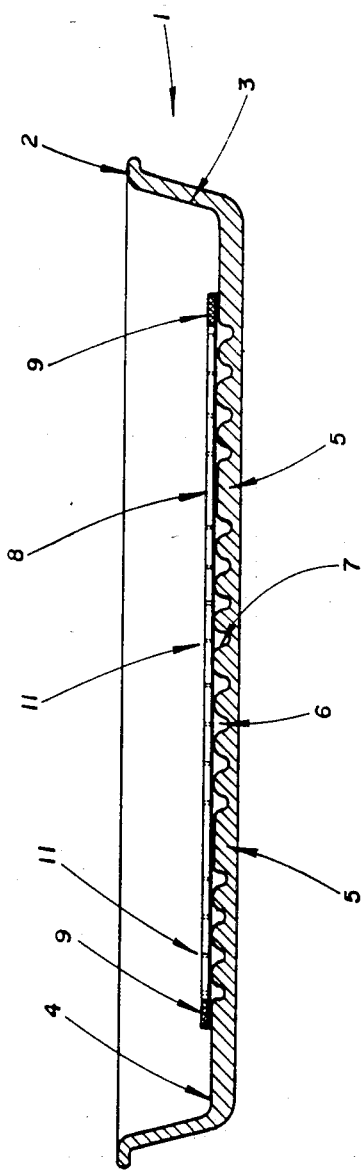
FIGURE II

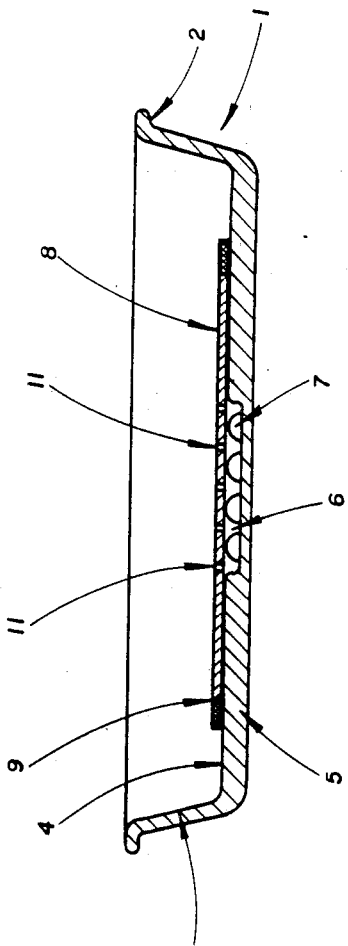
FIGURE III

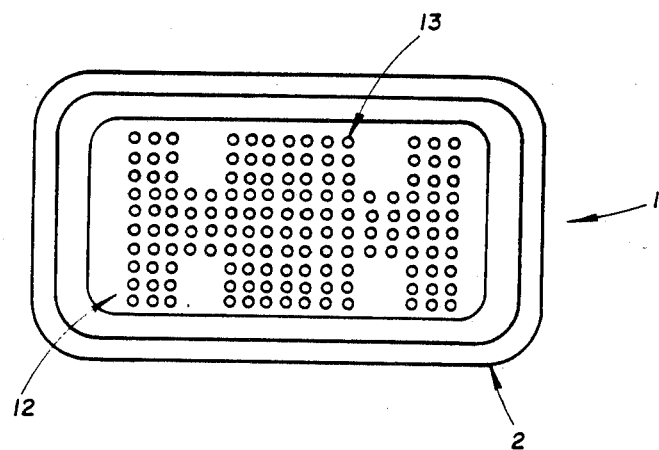
FIGURE IV
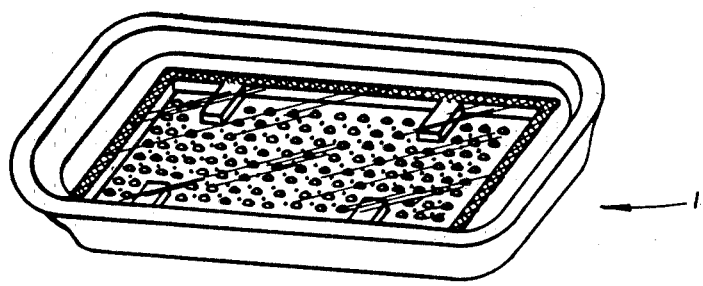
FIGURE V

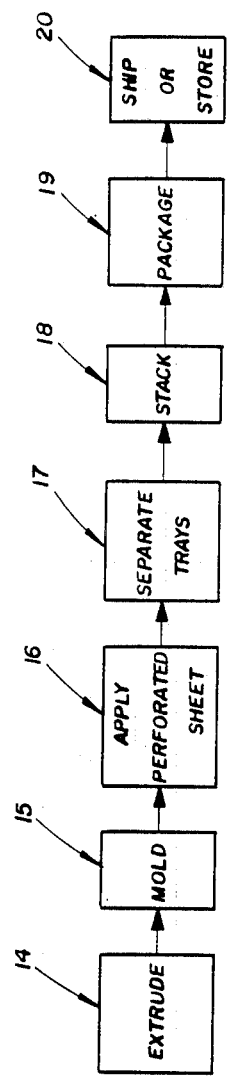
FIGURE VI

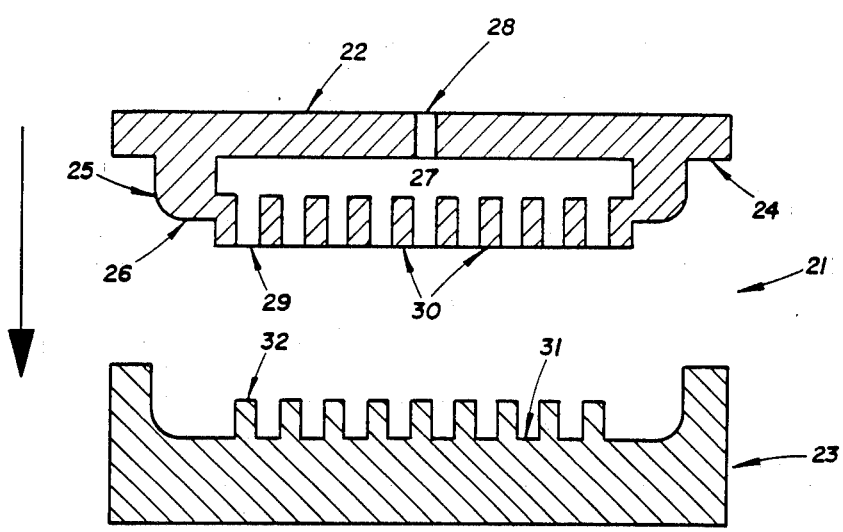
FIGURE VII

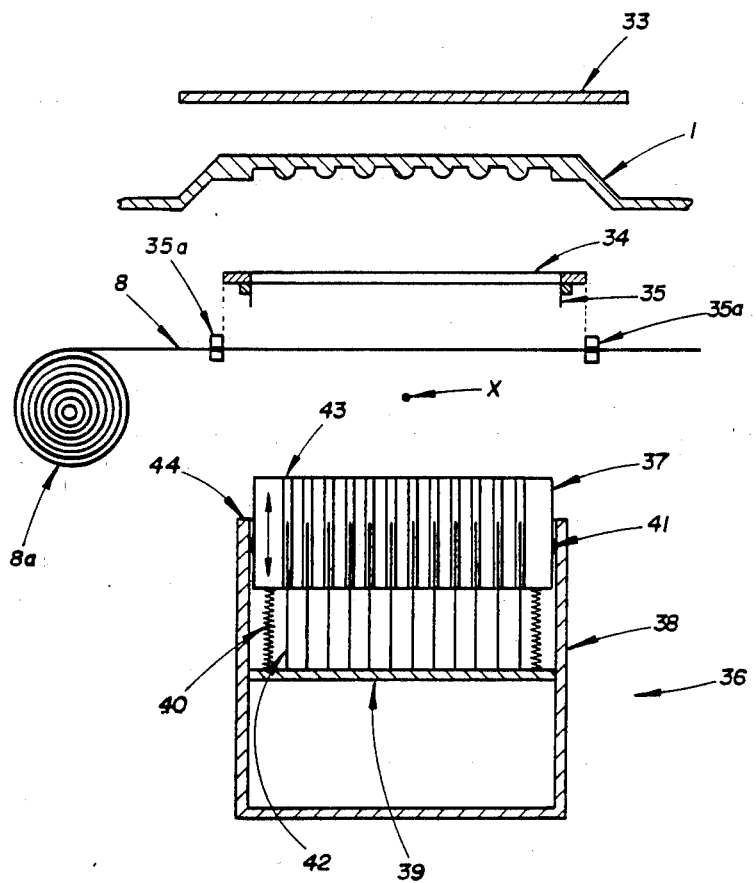
FIGURE VIII

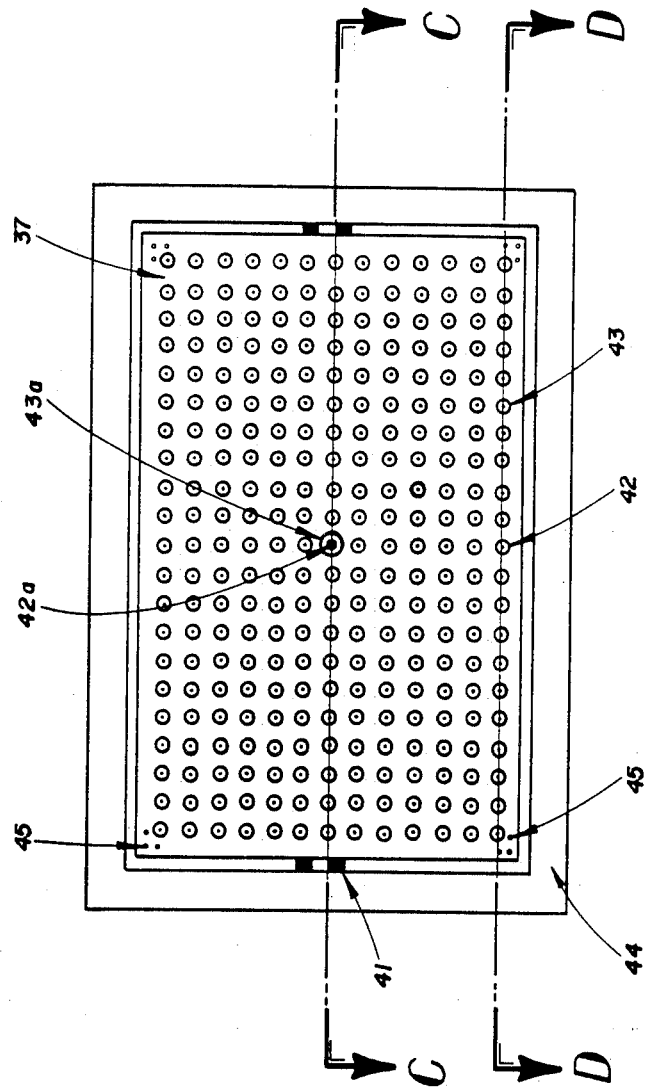
FIGURE IX

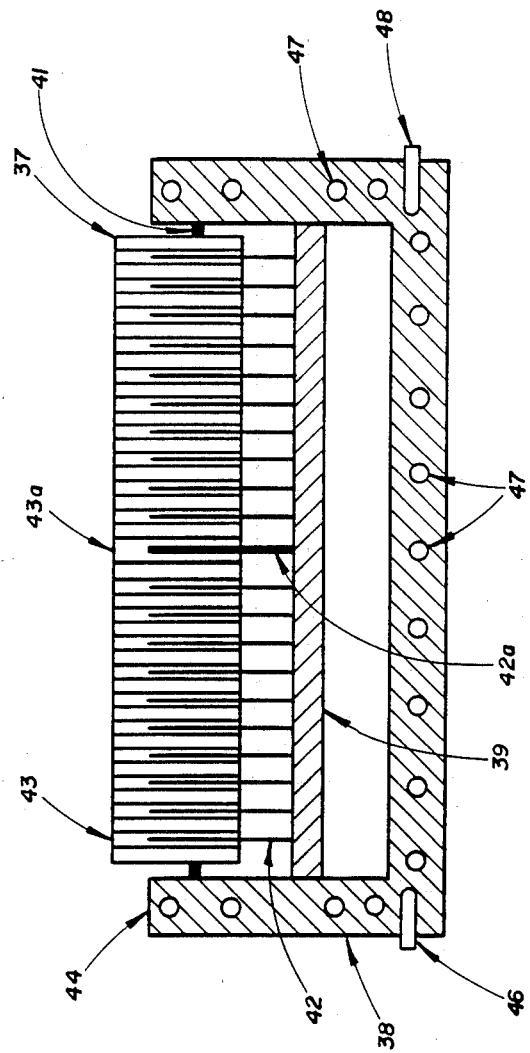
FIGURE X

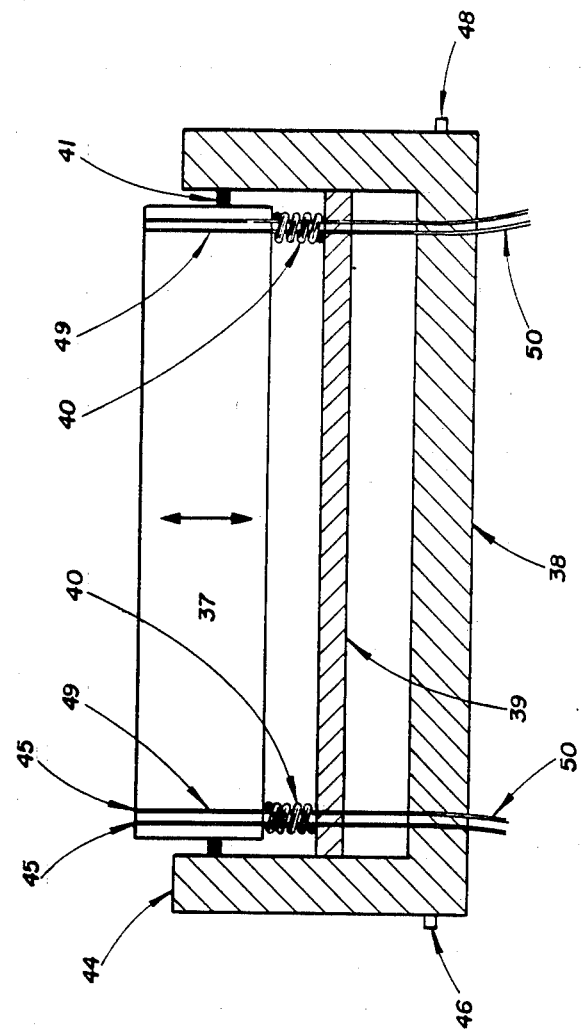
FIGURE XI

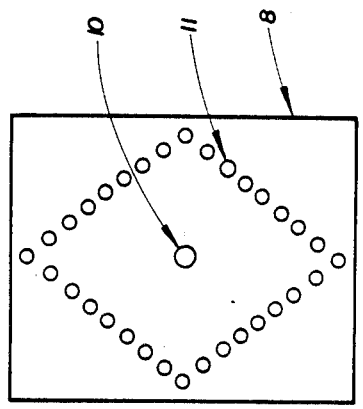
FIGURE XIII
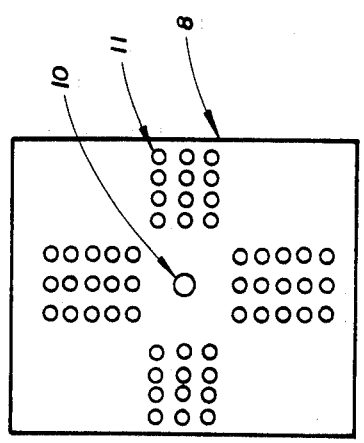
FIGURE XII

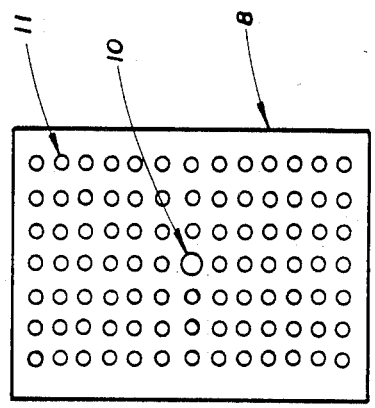
FIGURE XIV
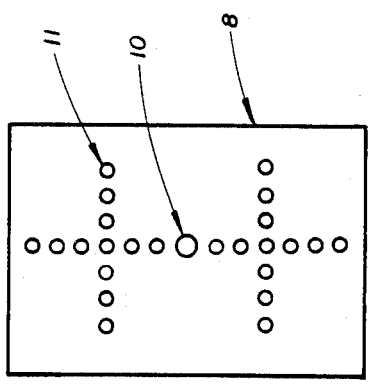
FIGURE XV

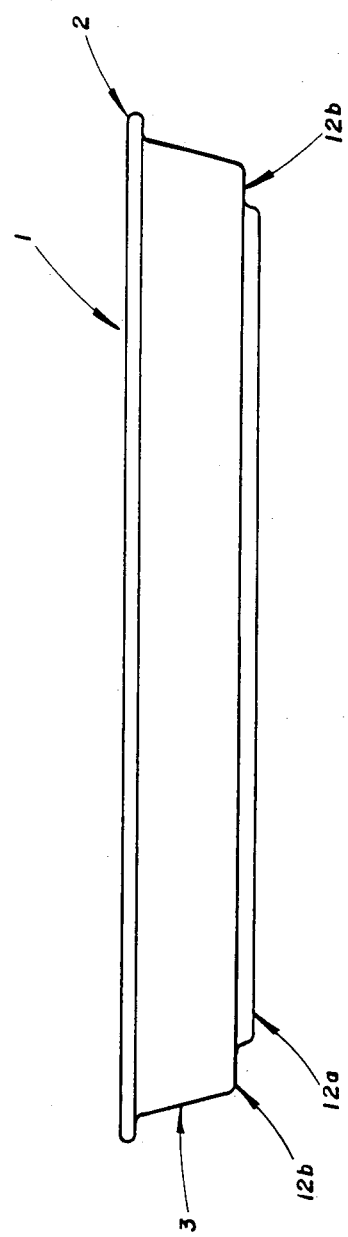
FIGURE XVI

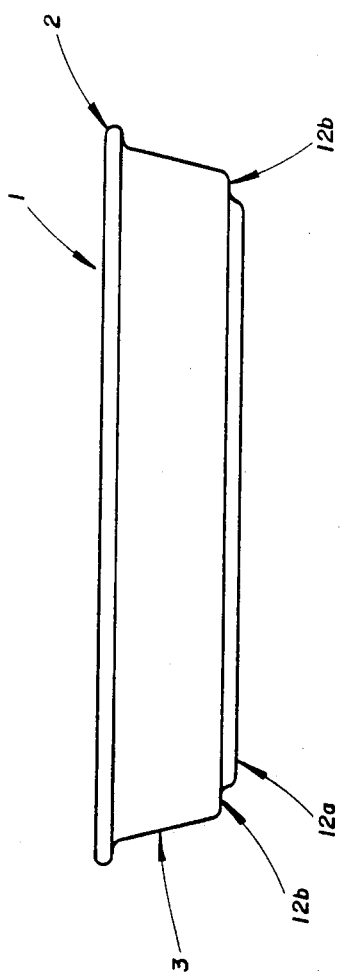

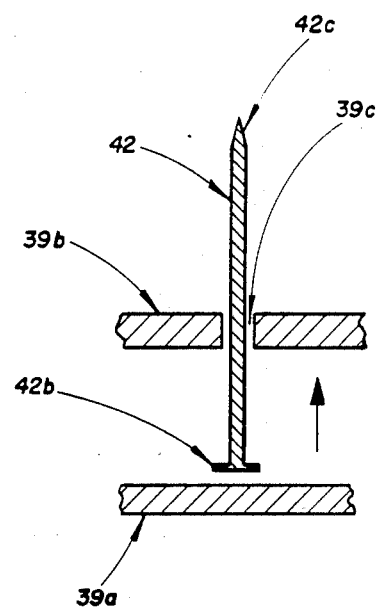
FIGURE XVIII

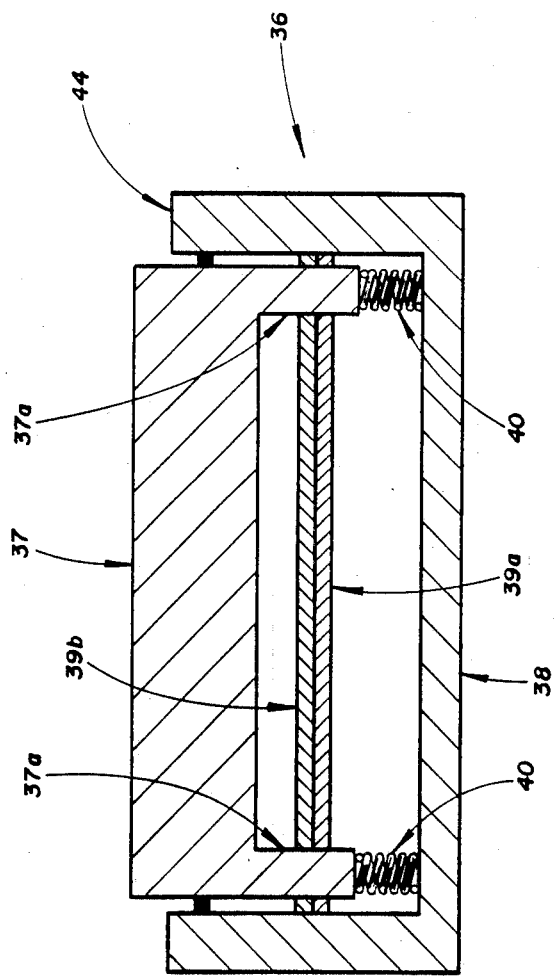
*FIGURE XIX*

PURGE TRAP TRAY

This application is a continuation of application Ser. No. 443,993 filed on Nov. 23, 1982, now abandoned.

FIELD OF THE INVENTION

The field of the present invention broadly encompasses that of trays for supporting and displaying food products. More particularly, the field of the present invention is directed to trays for supporting and displaying a food product which exudes juices or other purge liquids.

BACKGROUND OF THE INVENTION

Research has shown that the liquids dripping from poultry are a focal point of bacterial spoilage within packaged fresh meat and other poultry products. The growth of micro-orgaisms, particularly bacteria and yeast, occurs at a very rapid rate in such exuded fluids. The exudate is objectionable from an appearance standpoint, and moreover, the packed meat rapidly becomes objectionable because of odor and yeast growth even though the meat, itself, may be in a normal wholesome condition. Consequently, although the meat, itself, may be wholesome and acceptable, the fluid exuded from the meat and contained within the package will cause the whole package of meat or poultry to be unsellable.

It is very important in the display and sale of packaged poultry and pre-cut meats that the package present a clean and wholesome appearance. The problem of maintaining such a clean and wholesome appearance is greatly aggravated by the fact that, as stated above, many meats, particularly pre-cut meats and poultry, exude moisture containing suspended solids which cause the package to appear unclean. Further problems arise in that this exudate often evaporates or is absorbed in the packaging materials and then the suspended solids may be deposited on the food product and/or on the package. Accordingly, it is desireable from both a health and an aesthetic standpoint to remove the purge juices not only from the vicinity of the packaged product but also completely from view.

It has been conventional practice to display meat, poultry, and other food products in individual packages which comprise a supporting tray with an absorbent pad of tissue-like paper wadding in the bottom of the tray to absorb any juices or liquids exuded from the food product. A transparent outer plastic wrapping is also usually employed to cover and totally surround the package. A major problem associated with packages of this sort, as stated above, is the fact that the exuded liquids support the rapid growth of bacteria. In many cases the bacteria migrate from the absorbent pad back to the food product itself and result in the spoilage and discoloration of the food product. Such spoilage and discoloration quickly renders the food product unsuitable for sale.

In an effort to alleviate the above problems, and to extend the shelf-life of such food products, it has previously been proposed to employ an absorbent pad in the package which includes an imperforate plastic film positioned above a layer of absorptive wadding in such manner that the plastic film acts to retard the reverse migration of the liquids from the absorbent wadding back to the food product. Also, it has been previously proposed to position a non-absorptive barrier above the absorbent material for this purpose, note U.S. Pat. No. 3,026,209 to Niblack et al. While the above package constructions do provide a spacial relationship between the exuded liquids in the pad and the food product, they nevertheless still permit the substantial migration of bacteria back to the food product and are thus not totally satisfactory.

Another proposal in this area is disclosed in U.S. Pat. Nos. 4,321,997 and 4,275,811 both to A. H. Miller. U.S. Pat. No. 4,275,811 discloses an absorbent pad which comprises a mat of liquid absorbent material, an imperforate, liquid impermeable upper sheet overlying and covering the mat of absorbent material, and a bottom sheet of liquid impermeable material underlying the mat. The peripheral edges of the upper and bottom sheets are sealed together to enclose the mat of absorbent material therebetween, and the bottom sheet includes a plurality of openings which permit passage of a liquid into the absorbent material so that the liquid is held, by the mat, out of contact with the food product.

U.S. Pat. No. 4,321,997 essentially deals with an improvement on the structure disclosed in the U.S. Pat. No. 4,275,811 patent wherein the improvement includes spacer means disposed between the two sheets of material thereby maintaining the separation of the sheets under the compressive load exerted by food products or the like resting thereon. Utilization of the spacer means minimizes the compression of the mat by the food product and thus increases the ability of the mat to absorb and retain liquids while subjected to such a load.

While the inventions disclosed in the patents to Miller have resulted in advancements within the present field, a fundamental problem in this area continues to persist. This fundamental problem is the labor cost involved in inserting any type of pad into a tray. This cost encompasses not only the labor cost but, alternatively, the cost of purchasing and maintaining a machine which is adapted to place pads in each tray. A machine of this type is disclosed in U.S. Pat. No. 3,832,823 to Currie. Of course, an additional intrinsic cost is the cost of the pad itself.

OBJECTS OF THE PRESENT INVENTION

It is one object of the present invention to overcome the deficiencies intrinsic in the prior art tray products discussed above.

Another object of the present invention is to provide a new and improved packaging tray particularly suitable for packaging fresh poultry and other meats or juicy foods.

A further object of the present invention is to provide a new and improved packaging tray having integral means for removal of excess fluids from the vicinity of the food packaged therein.

Still a further object of the present invention is to provide a packaging tray having a purge reservoir which isolates the purge or exudate from a food product resting on the tray.

Yet another object of the present invention is to provide a packaging tray which presents a wholesome and clean appearance to a customer.

One more object of the present invention is to provide a packing tray having a hidden purge trap or reservoir.

An even further object of the present invention is to provide a process for manufacturing a packaging tray having a purge trap or reservoir which isolates the purge or exudate from a food product resting on the tray.

It is also an object of the present invention to provide apparatus for manufacturing a packaging tray having a purge trap or reservoir which isolates the purge or exudate from a food product resting on the tray.

Still further objects and the broad scope of applicability of the present invention and its numerous cognate benefits and features will become apparent to those of ordinary skill in the art from the details given hereinafter. However, it should be understood that the following detailed description and specific examples which indicate the presently preferred embodiments of the present invention are given by way of illustration only since various changes and modifications within the spirit and scope of the invention will become apparent to those of ordinary skill in the art from this detailed description.

SUMMARY OF THE INVENTION

The present invention encompasses a food tray for utilization in packaging a product or products which exude juices or other purge materials. More particularly, the tray includes a sunken reservoir into which the juices or purge material may drain and be retained out of contact with the food product. The reservoir is formed by heat sealing a perforated liquid impermeable thermoplastic sheet in a liquid tight manner to a raised shoulder area of the tray to form a perforated false bottom through which the juices may drain. The thermoplastic sheet is further supported by standoffs which may be integral with the tray bottom and which rise up from the interior tray bottom. The volume of the reservoir can be varied, as desired, by varying the height that the shoulder area and standoffs are raised from the interior of the tray bottom. Additionally, the volume of the reservoir can be increased by recessing or sinking the reservoir area of the tray bottom to the extent that the corresponding exterior area of the tray bottom is lowered with respect to the peripheral exterior tray bottom area. In one embodiment the thermoplastic sheet material is opaque and the reservoir and juices contained therein remain hidden from the view of a customer. In a more preferred embodiment, the thermoplastic sheet is colored so as to correspond with the color of the tray and, therefore, the tray and sheet of thermoplastic material heat sealed thereto present a unitary appearance.

BRIEF DESCRIPTION OF THE DRAWINGS

FIG. I is a top plan view of a preferred embodiment of a food tray in accordance with the present invention.

FIG. II is a cross-sectional view of the tray of FIG. I with the cross-sectional view being taken along the line A—A depicted in FIG. I.

Figure 1:
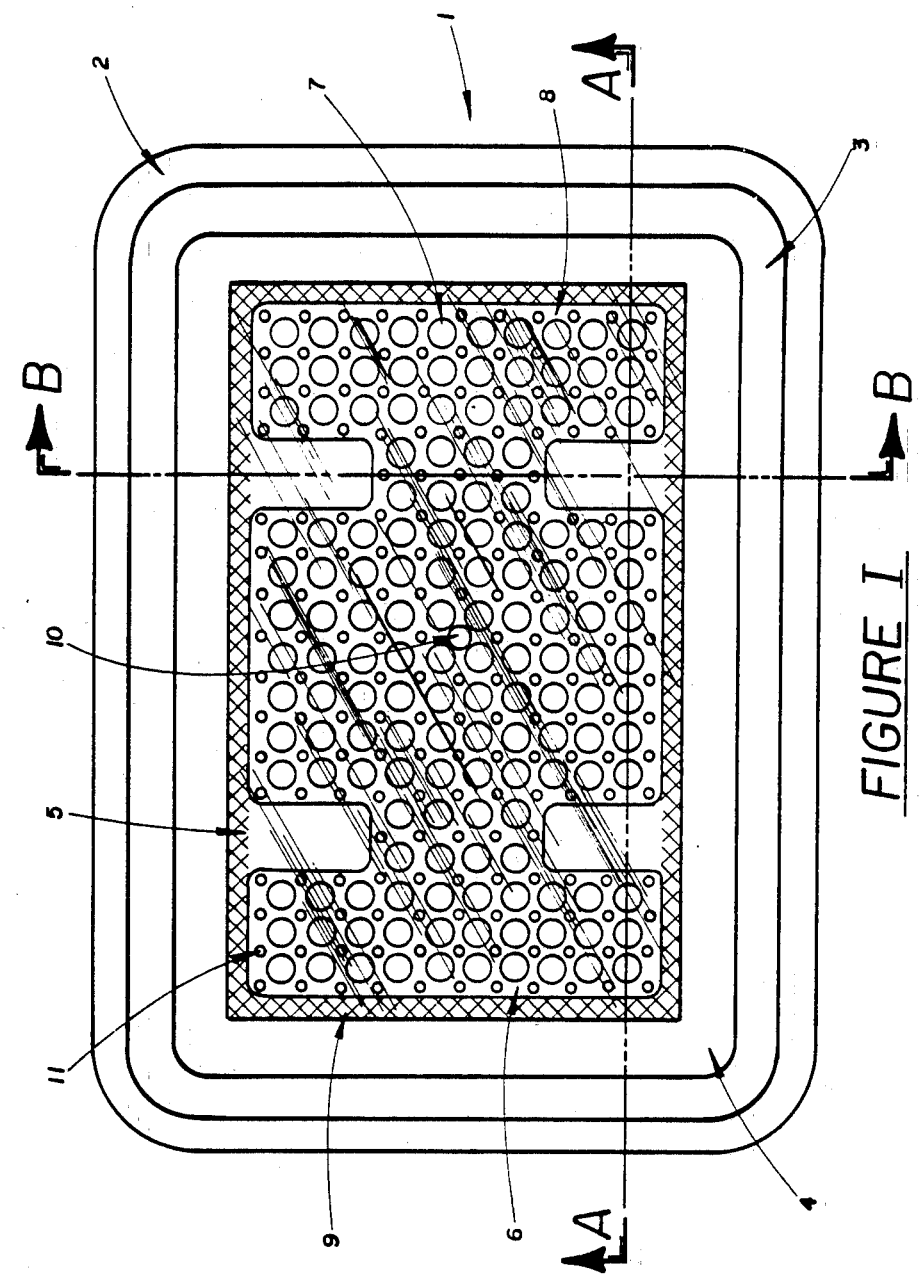

FIG. III is a cross-sectional view of the tray of FIG. I with the cross-section being taken along the line B—B depicted in FIG. I.

FIG. IV is a bottom plan view of the tray of FIG. I.

FIG. V is an isometric view of the tray depicted in FIG. I.

FIG. VI is a schematic diagram of a preferred process for forming a food tray in accordance with the present invention.

FIG. VII is a cross-sectional view of a preferred embodiment of a mold for utilization in forming the molded portion of a food tray in accordance with the present invention.

FIG. VIII is a cross-sectional view of a preferred apparatus which, in accordance with the present invention, may be utilized to heat seal a border area of a perforated thermoplastic sheet to the shoulder area of a tray in accordance with the present invention.

FIG. IX is a top plan view of the apparatus of FIG. VIII taken from the perspective of point X as denoted in FIG. VIII.

FIG. X is a cross-sectional view of the apparatus of FIG. IX taken along the line C—C depicted in FIG. IX.

FIG. XI is a cross-sectional view of the apparatus of FIG. IX taken along the line D—D depicted in FIG. IX.

FIG. XII is a top plan view of a first perforation pattern.

FIG. XIII is a top plan view of a second perforation pattern.

FIG. XIV is a top plan view of a third, perferred, perforation pattern.

FIG. XV is a top plan view of a fourth perforation pattern.

FIG. XVI is a front plan view of a second embodiment of a tray support structure in accordance with the present invention.

FIG. XVII is an end plan view of the second embodiment of a tray support structure of FIG. XVI.

FIG. XVIII is a cross-sectional view of an arrangement for retaining a perforation pin on a cross plate.

FIG. XIX is a cross-sectional view of a preferred embodiment of a transfer block in accordance with the present invention.

DETAILED DESCRIPTION OF THE DRAWINGS AND PREFERRED EMBODIMENTS

Turning now to the drawings wherein like reference numerals refer to like structure or like processing steps, it can be seen that FIG. V is an isometric view of a preferred embodiment of a product supporting tray 1 manufactured in accordance with the teachings of the present invention.

FIG. I is a top plan view of the tray 1 of FIG. V. Tray 1 comprises a substantially horizontal lip 2 which extends entirely around the outer periphery of the top of the tray walls 3. The tray walls 3 may be vertical or somewhat inclined to a substantially planar or horizontal raised shoulder area 4. The preferred tray embodiment illustrated in FIG. I and the other product drawings includes a shoulder area 4 of the tray 1 which is provided with two pairs of support ribs 5 which are approximately perpendicular to the longitudinal axis of the tray 1. In other words, support ribs 5 are approximately parallel to the lateral axis of the tray 1. The presence of support ribs 5 is not essential to the functioning of the tray as will be described hereinafter, however, experimentation has disclosed that support ribs 5 reduce the lateral deformation which the tray undergoes when it and a product supported thereon is wrapped with wrapping material as is standard in the industry. Shoulder area 4 and support ribs 5 surround and are raised up from a sunken tray reservoir area 6. Numerous standoffs 7 rise up from reservoir area 6 to a height which is essentially the same as that of shoulder area 4 and support ribs 5. A sheet of thermoplastic film 8 is heat sealed about its border area 9 to shoulder area 4 in a liquid tight manner. The thermoplastic sheet is further supported by support ribs 5 and, in particular, standoffs 7. The number and pattern of standoffs 7 is not critical except to the extent that the number and location of standoffs 7 must be sufficient to, in combination with shoulder area 4 and in this preferred embodiment, support ribs 5, support the thermoplastic sheet 8 and a product which may be placed thereon. Thus, the number, size, shape and pattern of standoffs 7 may vary depending upon the weight of the product which is to be supported. An adequate number of appropriately spaced and sized support ribs 5 could, if desired, be utilized as the sole standoff means. Thermoplastic sheet 8 is perforated at numerous points by holes 11 which are designed so as to allow juices or other purge liquids exuding from a product placed thereon to pass, by capillary action, down into reservoir area 6. Additionally, thermoplastic film 8 is provided with a centrally located larger perforation 10 which is designed to allow free flow of juices or other purge liquids down into reservoir 6. The larger perforation 10 is centrally located to minimize the reverse flow of purge or other exuded liquids out of the reservoir 6 by way of perforation 10 upon tilting of tray 1 by a consumer or other individual. No immediate reverse flow will occur by way of the capillary perforations 11 upon tilting of tray 1. Accordingly, while the purge juices will readily accumulate within reservoir 6 the juices will still be retained in reservoir 6 even though tray 1 is tilted to a great degree. Of course, no reverse flow, whatsoever, will occur while the tray is in a planar position unless the reservoir 6 has been completely filled with purge.

FIGS. II and III are cross-sectional views of the tray 1 of FIG. I taken along lines A—A and B—B, respectively. These Figures further illustrate the same features which are present in FIG. I from different perspectives and thus further clarify the disclosed tray structure. In these views the thickness of thermoplastic sheet 8 has been enlarged for purposes of clarity and such is also the case, where necessary, with regard to other features illustrated throughout the drawings. Additionally, if heat sealing is selected as the method for adhering border area 9 of sheet 8 to tray shoulder area 4, the border area 9 of sheet 8 will generally be fused into shoulder area 4. Accordingly, sheet 8 will usually not be elevated above the surface of shoulder area 4.

FIG. IV is a bottom plan view of the tray of FIG. I. This view discloses the presence of tray bottom 12 which includes, in this disclosed preferred embodiment, a pattern of indentations or dimples 13 which are created during the formation of standoffs 7. FIGS. XVI and XVII are front and end plan views of another possible tray bottom 12 configuration in accordance with the present invention. These Figures disclose an embodiment where the reservoir area 6 of the tray has been recessed or sunken to the extent that the corresponding exterior tray bottom area 12a has been lowered with respect to the peripheral exterior tray bottom area 12b. This recessing increases the volume of reservoir 6. Preferably, exterior tray bottom area 12a is not lowered to an extent where it interferes with the nesting of a stack of trays.

Our research and experimentation has revealed that the pattern of capillary perforations 11 significantly affects the flow rate of purge juices or liquids down into reservoir 6. This fact was revealed by an experiment in which whole chicken breasts were placed on four trays wherein the thermoplastic sheet 8 had the perforation patterns illustrated in FIGS. XII, XIII, XIV and XV. The trays 1 and the supported product, i.e. chicken breasts, were overwrapped and placed in a lab refrigerator for approximately three days. The results of this experiment were as follows:

In the sample utilizing the perforation pattern of FIG. XII only approximately one-third of the available purge liquids drained down in reservoir 6. This result was considered poor. It was noted that after all the chicken was removed the remaining liquid did, in fact, drain down into reservoir 6.

In the sample utilizing the perforation pattern illustrated in FIG. XIII most of the available liquid had drained down into reservoir 6. This result was deemed fair.

In the sample utilizing the perforation pattern illustrated in FIG. XIV all of the available liquid had drained down into the reservoir 6. This result was considered good.

In the sample utilizing the perforation pattern depicted in FIG. XV all of the available liquid drained down into reservoir 6. However, this result was deemed indefinite since it was determined that the originally available purge liquids had been drained from the chicken prior to its being placed on the tray. Accordingly, the total purge liquid avalable for draining was somewhat limited in this sample.

From this test it would appear that the perforation pattern of FIG. XIV would be preferred.

The size, shape and geometric design formed by standoffs 7 is not critical to the present invention. Of course, the height of standoffs 7 will, to some extent, influence the total storage capacity of reservoir 6. In other words, the total volume available in reservoir 6 will increase with the height that standoffs 7, shoulder area 4 and, if utilized, support ribs 5 are raised up from tray bottom reservoir area 6. In some cases standoffs 7 having variable heights may be desired. For example, the heights of the standoffs 7 may be slowly decreased toward the center of the tray 1 with the standoffs 7 having the least height being located in the vicinity of large central perforation 10. Such a configuration directs and aids in the flow of the purge liquids or juices to free flowing perforation 10 since the thermoplastic sheet 8 would be generally downwardly depressed in a funnel or cone fashion by the weight of a product placed thereon. Accordingly, the purge juices or other liquids would be directed by gravitational flow to the larger perforation 10.

The standoffs 7 which are illustrated in the Figures are generally cylindrica in shape. Those skilled in the art will readily recognize that standoffs having different geometric shapes and forming various geometric patterns are acceptable so long as adequate support of thermoplastic sheet 8 is provided. For example, standoffs having geometric shapes and patterns such as diamonds, circles, pyramides, rectangles and/or maze like ribs are within the scope of the present invention. The standoff means may even be limited to an adequate number and arrangement of support ribs 5 as is the case in one embodiment of the present invention wherein the sole standoff means consists of two pairs of support ribs 5 with each rib extending in an offset, parallel and laterally overlapping fashion from opposing sides of the tray reservoir area 6. In any event, those skilled in the art will readily recognize that support ribs 5 merely illustrate a type of standoff which performs the function of providing lateral structural support to the tray in addition to otherwise supporting sheet 8.

Among some of the type of plastic materials which are suitable for fabrication into the support portion of tray structures of the present invention are the polyolefins such as polyethylene, polypropylene, polybutene, polystyrene, high impact polystyrene, polyurethane, polyvinylidene chloride, paper pulp, acetate and others. A particular material which has been found to be well suited for fabrication of the present tray structure is foamed polystyrene. The closed cell structure of the foamed polystyrene prohibits absorption or penetration of liquids into the tray body and the foam material itself is extremely lightweight permitting ease of handling and transport.

As hereinbefore indicated, a preferred material employed in the formation of the support portion of the tray structure of the present invention is plastic and, in particular, foam thermoplastic materials and especially polystyrene foam. The polystyrene foam may be manufactured utilizing any one of the number of conventional extrusion techniques, for example, extrusion of foamable polystyrene beads, i.e. beads which have a blowing agent already incorporated in them prior to delivery to an extrusion apparatus or, for example, by direct injection extrusion techniques wherein a foamable agent is added to a molten mass of polystyrene contained with an extruder prior to extrusion thereof from a die oriface.

After the polystyrene foam sheet material has been produced utilizing the conventional extrusion techniques such as those discussed above, it may be molded to form the support structure of the tray of the present invention. In general, it is desirable to preheat the foamed polystyrene sheet before it is molded in order to assure that the sheet will be at a sufficiently elevated temperature to permit rapid forming of the desired tray structure in the mold. Additionally, the mold may, likewise, be heated, by means well known in the art, to further assist in the rapid molding of the desired tray structure. An example of such heating means is hot water circulating within the mold sections. After preheating the foamed polystyrene sheet, the molded support structure of the tray in accordance with the present invention may be conveniently formed utilizing a molding operation. A cross-sectional view of a preferred embodiment of a mold which may be utilized to form the molded support structure of a tray in accordance with the present invention is illustrated in FIG. VII. Such a mold is generally designated at 21. The mold comprises a male section 22 and a female section 23. The sections interface as indicated by the arrow in FIG. VII. Male mold section 22 includes tray lip forming area 24, tray wall forming area 25 and tray shoulder forming area 26. A support rib forming area may also be included in the male mold section however it is not depicted in this particular cross-sectional view and is only necessary when the added support and rigidity of support ribs 5 is desired. Male mold section 22 further comprises a vacuum chamber 27 which has a vacuumizing inlet 28 which may be connected to vacuumizing apparatus (not shown) well known in the art. Vacuum chamber 27 further commutes with vacuum channels 29 which are shaped so as to generate the desired geometric shape, for example cylindrical, of standoffs 7. Male mold section 22 also includes tray reservoir forming areas 30. Female mold section 23 includes tray bottom forming area 31 and prongs 32 which, during the molding process, cooperate with and are inserted into vacuum channels 29. If the tray support structure of FIGS. XVI and XVII is desired, the female mold section 23 would include a recessed area to allow for the further recessing or sinking of tray bottom 12 as at 12a. The insertion of prongs 32 into channels 29 assists the vacuumizing force provided by way of vacuum chamber 27 and vacuum channels 29 in the formation of standoffs 7. Prongs 32 are not essential to the formation of standoffs 7 since it has been found that standoffs 7 of adequate height can be formed solely through utilization of the vacuumizing force applied by way of vacuum channels 29. However, prongs 32 have proved helpful in the formation of standoffs 7 of greater height. Care should be taken to assure that prongs 32 are not so long that they physically perforate the polystryene sheet and form standoffs 7 having holes therein. Such structure is undesirable in that the purge juices could drain completely out of the tray. As stated previously, it may be desired to have the height of standoffs very decreasingly toward the center of the tray and, in particular, toward the location of large perforation 10. One method for accomplishing such a configuration is to form the standoffs 7 which are furtherest from perforation 10 by utilization of both a vacuumizing force applied by vacuum channels 29 and also by utilization of prongs 32 while forming the standoffs 7 located near perforation 10 only by vacuumizing force. In other words, utilization of prongs 32 would be omitted in formation of standoffs 7 located near perforation 10.

From the above it can be seen that formation of the support structure of a thermoplastic tray 1 in accordance with the teachings of the present invention takes place when a heated sheet of appropriately desired thermoplastic material is placed between the mold sections 22 and 23 and the mold sections are closed down to a desired mold gap which will be equivalent to the desired thickness of the finished molded tray. As the mold sections 22 and 23 are closed the thermoplastic material is deformed by the various areas of the mold sections described above. Moreover, prongs 32 push portions of the heated material up into vacuum channels 29. At the same time the vacuumizing force applied to vacuum channels 29 by way of vacuum chamber 27 and vacuum inlet port 28 pulls the thermoplastic material up into vacuum channels 29 and forms standoffs 7 of the desired geometric pattern and shape.

Turning to FIG. VI which, in block diagram form, depicts the various processing steps associated with the wholesale manufacture and distribution of a tray in accordance with the present invention, it can be seen that molding step 15, discussed above, is followed by the step of applying a perforated themoplastic sheet 8 to the support structure of tray 1. This application step is designated as step 16 in FIG. VI.

FIG. VIII is a cross-sectional view of a preferred embodiment of an apparatus 36 which may be utilized to apply a perforated sheet 8 to the support structure of tray 1. The means of application utilized by this preferred apparatus is heat sealing. However, other appropriate sealing means such as ultrasonic sealing or gluing may be appropriately utilized. FIG. VIII reveals that the support structure of tray 1 is positioned with respect to a backing plate 33. Backing plate 33 provides support for the support portion of tray 1 at the moment of application of the thermoplastic sheet 8 thereto. A support bar 34 which comprises a hot cutting frame 35 shaped so as to cut or melt out an appropriately sized portion of material from the thermoplastic sheet 8 is appropriately positioned with regard to the support portion of tray 1. If desirable, other cutting means may be substituted. Examples of such means are hot wire means, punch and die means or shearing knife means. Clamping elements 35a serve to retain the thermoplastic sheet 8, which is provided from roll 8a, in a horizontally stationary position during the totality of application step 16. Since the heat associated with hot cutting frame 35 will adversely affect thermoplastic sheet 8, clamping elements 35a, preferably, are vertically moveable so that sheet 8 may be temporarily brought into close physical proximity with hot cutting frame 35 as will be later described.

Apparatus 36 comprises a transfer block 37 which is formed from a material having a low thermal conductivity. Examples of such materials are wood, asbestos and ceramics. A preferred ceramic is an epoxy filled ceramic such as cyntactic foam. The low thermal conductivity of transfer block 37 allows it to be positioned close to heated sealing frame 38 and still maintain a low temperature. This is desirable in order to avoid any sticking or tackiness of sheet 8 upon its contact with transfer block 37 as hereinafter described. The coating of transfer block 37 with a fluorocarbon polymer such as tetrafluoroethylene or a fluorinated ethylene-propylene material has also been found to greatly reduce or eliminate such sticking. These materials are commonly referred to as teflon. Teflon is a trademark of E. I. DuPont de Nemours & Co. Transfer block 37, in this embodiment has a generally rectangular shape and is slidingly coupled to a generally rectangular sealing frame 38 by way of means 41. Preferably, means 41 includes at least two pairs of pins with each pair extending from opposite sides of transfer block 37 and which cooperate with notches in sealing frame 38. Utilization of a pair of pins, as opposed to a single pin, on each opposing side of transfer block 37 greatly reduces any potential cocking or tilting of block 37 during its movement as will be hereinafter described. Additionally, transfer block 37 is resiliently mounted on sealing frame 38 by way of spring means 40. Sealing frame 38 is also provided with a cross plate structure 39. Preferably, cross plate structure 39 comprises an upper plate 39b and a lower plate 39a in close proximity. Upper plate 39b is provided with a grid of holes 39c, for example a 10 by 20 grid for a total of 200 holes. In practice perforation pins 42 which are, preferably, stainless steel are inserted through holes 39c in a pattern corresponding to the perforation pattern desired for sheet 8. Each pin 42 is provided with a flattened plane head 42b perpendicular to its longitudinal axis. The width of the pin head 42b is designed to be greater than the diameter of holes 39c. Accordingly, the pin heads 42b will be trapped by and retained between plates 39a and 39b upon plate 39a being brought into close physical proximity to plate 39b and into planer contact with the pin heads. Plates 39a and 39b may be coupled about their periphery by means well known in the art such as bolts. This arrangement provides an easy means whereby the perforation pin pattern may be readily rearranged. Figure XVIII is a cross-sectional view of a small portion of plates 39a and 39b including one hole 39c and an associated perforation pin 42. Of course, other embodiments of perforation pins 42 are possible. For example, perforation pins 42 may comprise piano wire which has been folded in a doubled-up fashion. In this instance, the free ends of the piano wire may be attached to lower plate 39a with the doubled-up wire being inserted through the holes 39c in plate 39b. the perforation pins are also arranged so as to be inserted into and through perforation pin channels 43 which pass entirely through the thickness of transfer block 37.

FIG. IX is a top plan view of the apparatus 36 illustrated in cross-section in FIG. VIII. The pattern of perforation pin channels 43 and perforation pins 42 illustrated in FIG. IX is a pattern which may be utilized to obtain the perforation pattern illustrated in FIG. XIV. As previously stated, this perforation pattern is preferred. Additionally, FIG. IX gives a more distinct view of the larger perforation pin channel 43a and the larger perforation pin 42a which are centrally located in transfer block 37. Elements 42a and 43a cooperate to form the larger central perforation 10 discussed above.

FIG. IX discloses yet another feature of transfer block 37. This is the presence of vacuum ports 45 at the corners of transfer block 37. The vacuum ports 45 are the portals of vacuum channels 49 which progress completely through transfer block 37 as do the perforation pin channels 43. Vacuum channels 49 are connected by way of vacuum tubing or other means well known in the art to a vacuumizing source (not shown). The arrangement and number of vacuum ports is not critical, however, a triangular arrangement of three ports in each corner of the transfer block 37 has been found to be satisfactory. Vacuum ports 45 serve the function of temporarily retaining the thermoplastic sheet material 8 on the face of transfer block 37 during the step of applying the sheet 8 to the shoulder areas 4 of the molded portion of tray 1.

FIG. X is a cross-sectional view of the apparatus 36 along the plane C—C denoted in FIG. IX. This cross-sectional view is somewhat more detailed than the view of FIG. VIII. In particular, FIG. X depicts means for maintaining the sealing frame 38 at an elevated temperature. This means may be by any appropriate means conventionally known to those in the art. Examples of such include circulation of hot water through serpentine channels within the sealing frame 38 or use of electrical resistance. In one embodiment, hot water or another heating element would enter sealing frame 38 at entrance 46 and wind, in serpentine fashion, throughout the interior of sealing frame 38 as illustrated at 47. The heating element or fluid would exit the sealing frame 38 at exit port 48. Another way by which the temperature of sealing head 44 could be readily controlled is through the utilization of small cartridge heaters which are controlled by thermocouples in a manner well known to those in the art. One important function of the heating element is to assure that the sealing head 44 of the sealing frame 38 is maintained at a sufficient temperature to heat seal the thermoplastic sheet 8 to the support portion of tray 1. In particular, the temperature of sealing head 44 should be adjusted so that a good liquid tight heat seal is formed. This temperature will vary with the materials which are utilized for sheet 8 and the support structure of tray 1 and may be arrived at without undue experimentation. Generally speaking, this temperature will fall within a range having a lower boundary where the sheet 8 is not adequately adhered, e.g. non-uniform and thus non-liquid tight, to the support structure of tray 1 and an upper boundary where the sheet 8 and support structure will be melted. For purposes of example only, we have found that when the support portion of tray 1 is formed from a foamed polystryene material and sheet 8 comprises an oriented polystryene having an approximate thickness of 1.2 mils., the temperature of sealing head 44 should be maintained between 290° F. and 320° F. As was stated with regard to transfer block 37, sealing head 44 is, preferably, coated with teflon so as to reduce any sticking of border area 9 of sheet 8 to sealing head 44 during the heat sealing of border area 9 to shoulder area 4. Another important function of the heating means is that cross plate 39 and thus perforation pins 42 and 42a may be indirectly heated by conduction of heat through direct or indirect contact with the heated sealing frame 38. The heating of perforation pins 42, 42a assists the ends 42c of pins 42 and 42a in perforating the thermoplastic sheet 8. The ends 42c of perforation pins 42 and 42a may be either pointed, as in FIG. XVIII, or somewhat blunt as would be the case if folded piano wire was utilized. We have also found that when the perforation pins 42, 42a are heated, as discussed above, each perforation in sheet 8 is cylindrical in shape and surrounded by a rib of material which was melted during perforation. This is to be contrasted with a perforation formed by a room temperature perforation pin. In this case the perforation is funnel shaped and no surrounding rib is present.

A further important feature of the apparatus 36 is that the perforation pins 42 and 42a are of a length such that their ends or tips 42c are just slightly above the plane of the sealing head 44. This feature allows the perforation pins 42 and 42a to perforate the thermoplastic sheet 8 upon depression of the resiliently mounted transfer block 37 as will hereinafter be discussed in more detail.

FIG. XI is a cross-sectional view of the apparatus 36 taken along the plane D—D as denoted in FIG. IX. Much detail has been removed from this cross-sectional view so that it may primarily illustrate the details of apparatus 36 which are related to vacuumizing ports 45. FIG. IX reveals that vacuumizing ports 45 are the openings of vacuumizing channels 49 which pass entirely through transfer block 37. Thereafter, vacuum tubing 50 is connected, by means well known in the art, to vacuum channels 49. Upon the attachment of vacuumizing apparatus (not shown) well known in the art to vacuum tubing 50 it can be seen that a vacuum may readily be drawn through vacuum ports 45. The presence of a vacuum at the corners of transfer block 37 readily retains a thermoplastic sheet 8 in place while it is in contact with transfer block 37. FIG. XI also illustrates one embodiment of a possible resilient mounting 40 of transfer block 37 onto apparatus 36. In particular resilient spring means 40 may be mounted between the transfer block 37 and the cross plate 39 or, alternatively, between the transfer block 37 and the sealing frame 38. In a preferred embodiment transfer block 37 is provided with four leg members 37a with each leg 37a located at a bottom corner of transfer block 37 and extending through an appropriately sized aperature in cross plate 39. In this embodiment the four resilient spring means 40 are each mounted between the bottom of a respective leg member and sealing frame 38. Accordingly, in this preferred embodiment, transfer block 37 can be viewed as a table structure which is resiliently supported by spring means 40 under each leg 37a. This structure is generally depicted in FIG. XIX from which much detail has been removed. Such resilient mounting allows the transfer block 37 to be depressed upon the application of pressure to the face of transfer block 37. Of course, cross plate 39 should be arranged within the sealing frame 38 so that the depression of transfer block 37 at least to the plane of sealing head 44 will not be hindered. Such depression is necessary so as to allow the ends 42c of perforating pins 42 to be exposed from perforating pin channels 43 and thus be able to perforate a thermoplastic sheet 8 which is retained on the face of transfer block 37.

In view of the above discussion and turning back to FIG. VIII those skilled in the art will recognize that the application step 16 of FIG. VI may proceed as follows:

Upon the initial indexing of the support portion of tray 1 from a mold, for example 21 illustrated in FIG. VII, to a position directly above apparatus 36 and directly below backing plate 33 clamping means 35a will engage the sheet of thermoplastic material 8 and retain it in a relatively fixed horizontal position. At this point clamping means 35a and apparatus 36 will proceed to move toward hot cutting frame 35 and the support portion of tray 1. The vertical movement of clamping means 35a will stop when sheet 8 is just slightly below hot cutting frame 35. Apparatus 36 will, however, continue toward sheet 8. Upon contact of the transfer block 37 of apparatus 36 with thermoplastic sheet 8 the vacuumizing force which is applied to sheet 8 by way of vacuum ports 45 will act to retain sheet 8 in form contact with transfer block 37. Further movement of apparatus 36 will bring the retained sheet 8 into contact with hot cutting frame 35 and a section of thermoplastic sheet 8 will be cut out of sheet 8 and retained on transfer block 37. Hot cutting frame 35 will be sized so as to allow the passage of apparatus 36 therethrough. Moreover, hot cutting frame 35 will be sized to cut a portion of thermoplastic sheet 8 which is approximately the size of sealing frame 38. In other words, the edges of the portion of the thermoplastic sheet 8 extend completely or, at least, substantially cover sealing head 44. This area of sheet 8 which extends over sealing head 44 has previously been referred to as border area 9. Further continued movement of apparatus 36 toward the support portion of tray 1 and backing plate 33 brings the cut out portion of thermoplastic sheet 8 into contact with the support portion of tray 1. The support portion of tray 1 will be pushed backward by this contact into contact with fixed backing plate 33 which provides temporary physical support for the support portioon of tray 1 during the remainder of the application step 16. At this point the simultaneous heat sealing of the boder area 9 of the cut out portion of the thermoplastic sheet 8 and perforation of thermoplastic sheet 8 is accomplished by continuing the movement of apparatus 36 toward the support portion of tray 1 until such time as the sealing head 44 presses the overlying border area 9 of the thermoplastic sheet 8 into contact with the shoulder area 4 of the support portion of tray 1. This pressurized contact of the heated sealing head 44 accomplishes the liquid tight heat sealing of the border area 9 to raised shoulder area 4. Thus, the cut out portion of thermoplastic sheet 8 will be heat sealed completely about border area 9 to shoulder area 4. Such sealing of sheet 8 about its entire periphery (i.e. border area 9) to shoulder area 4 in liquid tight manner serves to prohibit any purge juices or other liquids which have flowed into reservoir 6 from exiting reservoir 6 by means of the juncture of sheet 8 and shoulder area 4. During this final step of movement of apparatus 36 towards the support portion of tray 1 which is supported by backing plate 33, the resilient means 40 which support transfer block 37 which, as was stated earlier, is slidingly attached by means 41 to sealing frame 38 will be compressed and transfer block 37 will be depressed to the plane of sealing head 44. This depression of transfer block 37 will result in the tips of heated perforation pins 42 and 42a being exposed from the perforation pin channels 43 and 43a. Upon the tips of the heated pins 42 and 42a being exposed they will perforate the thermoplastic sheet in the desired perforation pattern. After sealing and perforation has occurred, apparatus 36 is drawn away from the support portion of tray 1 leaving behind the cut out portion of thermoplastic sheet 8 which has been perforated and heat sealed about its border area 9 to shoulder area 4. Thereafter a new support portion of tray 1 and portion of thermoplastic sheet material 8 are indexed into position and the application step is repeated.

FIG. VI reveals that after the cut out piece of thermoplastic sheet 8 has been applied to the support portion of tray 1, each individual tray is separated from the roll of rays by means well known in the art. For example, the trays may be separated by cutting blades. Thereafter the separated individual trays are passed to a stacking station where they are stacked and prepared for packaging. After the trays have been packaged they may either be stored for inventory or shipped to an ultimate user.

Examples of thermoplastic materials which may be utilized to form thermoplastic sheet 8 are polymers and polymeric blends of the following monomers: thwe mono-olefins and conjugated di-olefins, e.g. ethylene, propylene, butene-1, isobutene, 1,3 butadiene, isoprene and other aliphatic mono and di-olefins; the halogen substituted olefins, e.g. vinyl chloride, vinylidene chloride; the mono/vinylidene aromatic compounds, e.g. styrene, alpha methylstyrene, chlorostyrene, other aromatic olefins and other unsaturated monomers such as acryonitrile, acrylamide and the like. Polyamide polymers, e.g. nylon 66 and nylon 6 may also be used. In one preferred embodiment the material from which thermoplastic sheet 8 is manufactured is the same as that from which the support structure of tray 1 is molded from. In another preferred embodiment thermoplastic sheet material 8 may be made from a foamed polystyrene which is the same as the material from which molded portion of tray 1 is made. Thermoplastic sheet material 8 may be dyed or otherwise colored to be the same or, at least, substantially the same color as the molded portion of tray 1. In this instance the presence of purge reservoir or juice trap 6 is very effectively hidden from view. Moreover, the opaque color of thermoplastic sheet 8 will completely hide the presence of the drained off purge materials from view.

While the present tray was designed so as to eliminate the necessity of a soaker pad or other absorbent material being placed within a tray, the present invention does, indeed, readily lend itself to utilization of such absorbent materials. Materials of this sort may be placed within the reservoir area 6 of the molded portion of tray 1 prior to the application, preferably by heat sealing, of thermoplastic sheet 8 to the raised shoulder area 4 of tray 1. The absorbent padding or wadding may contain bactericidal agents. The preferred bacteriostats are the broad spectrum antibiotics such as tetracyclines, e.g. chlortetracycline and oxytetracycline; penicillin; sorbic acid; alkyl substituted or alkyl aryl substituted quaternary ammonium compounds such as trimethyldodecylammonium chloride, cetyltrimethylammonium bromide and alkyldimethylbenzylammonium chloride; chlorine containing compounds such as the hypochlorites and chloramines; iodine compounds such as sodium hypoiodite; phenol and its derivatives such as pentachlorophenol and orthophenylphenol; dehydroactic acid; peroxygen compounds such as hydrogen peroxide, potassium persulfate, peracetic acid and sodium perborate. The batericidal or bacteriostatic agents may be applied to the absorbent material in any preferred manner. Two basic methods are firstly wetting the absorptive material with an aqueous solution of the agent and then drying, or, secondly, mixing or impregnating the absorptive material with a dry agent. Of course, any method of placing the bacteriostatic or bactericidal agents within the absorptive material so that they will come in contact with the exudate but not adversely affect product quality is acceptable.

Although the present invention has been described with preferred embodiments, it is to be understood that modifications and variations may be resorted to, without departing from the spirit and scope of the present invention. For example, the support portion of the tray does not have to be molded and any other appropriate means of formation is satisfactory. Additionally, the top surface of sheet 8 may be etched by means known in the art to reduce the surface tension thereof and allow more rapid flow of purge liquids into the reservoir 6 which may contain a wetting agent to assist in the purge which has dripped therein to move rapidly and evenly spread out within the confines of the reservoir. As those skilled in the art will readily understand, such variations and modifications are considered to be within the purview and scope of the appended claims.

We claim:

1. A purge trap tray adapted to display a product which exudes a purge, said tray comprising:
   (I.) a sunken reservoir area adapted to contain the liquid purge;
   (II.) a support portion adapted to support said product, said support portion comprising:
   (A) a shoulder area raised from and completely surrounding said sunken reservoir area;
   (B) standoff means rising from said sunken reservoir area;
   (C) a product supporting, perforated, liquid impermeable thermoplastic film supported by said standoff means, said film comprising:
      (i) a border area adhered to said shoulder in a liquid tight manner;
      (ii) a plurality of perforations having diameters adapted to allow capillary flow of purge into said reservoir; and,
      (iii) a centrally located perforation having a diameter adapted to allow free flow of the purge into said reservoir, said centrally located perforation having a greater diameter than that of any other perforation whereby flow of purge into the reservoir is increased and reverse flow of purge upon tilting of the tray is minimized.

2. The purge trap tray of claim 1 wherein the tray material comprises polystyrene foam and the film comprises polyethylene which film is adhered to the tray shoulder in the film's border area by a heat seal.

3. The purge trap tray of claim 1 wherein the film is opaque to hide purge collected in the reservoir from view.

4. The purge trap tray of claim 1 including an absorbent material in the reservoir area, said material containing a bacterial agent.

5. The purge trap tray of claim 1 wherein the standoff means comprises at least two standoffs rising from said reservoir to a substantially equal height.

* * * * *